United States Patent [19]
Ueda et al.

[11] Patent Number: 5,281,061
[45] Date of Patent: Jan. 25, 1994

[54] SEPARABLE ROTARY TOOL ADAPTER

[75] Inventors: Kouichi Ueda, Nara; Shinji Yasuhara, Kashiwara; Hitoshi Iwamoto, Nara; Toshiaki Oku, Higashiosaka, all of Japan

[73] Assignee: Koyo Seiko Co., Ltd., Osaka, Japan

[21] Appl. No.: 876,795

[22] Filed: May 1, 1992

[30] Foreign Application Priority Data

May 20, 1991 [JP] Japan ................. 3-44754[U]

[51] Int. Cl.$^5$ .............. B23C 9/00; F16H 13/06; B23B 39/10
[52] U.S. Cl. .................... 409/144; 408/126; 409/230; 475/183
[58] Field of Search ........... 409/136, 144, 234, 230, 409/232; 408/125, 126; 475/183, 263; 74/433

[56] References Cited

U.S. PATENT DOCUMENTS

| | | | |
|---|---|---|---|
| 4,060,334 | 11/1977 | Wagner | 408/126 |
| 4,082,475 | 4/1978 | Kuder | 408/126 X |
| 4,641,551 | 2/1987 | Pascaloff | 475/263 |
| 4,729,700 | 3/1988 | Hertel et al. | 409/144 |
| 4,950,110 | 8/1990 | Suzuki | 408/126 |
| 4,960,405 | 10/1990 | Katayama et al. | 475/183 |
| 4,981,403 | 1/1991 | Katayama | 409/136 |
| 5,033,921 | 7/1991 | Yasuhara et al. | 409/135 |
| 5,092,190 | 3/1992 | Kubo et al. | 74/433 X |

FOREIGN PATENT DOCUMENTS

| | | | |
|---|---|---|---|
| 172674 | 7/1989 | Japan | 475/183 |
| 46351 | 2/1990 | Japan | 475/183 |
| 645778 | 2/1979 | U.S.S.R. | 409/144 |

OTHER PUBLICATIONS

Abstract of JP-1-87125(A), vol. 13, No. 296 (M-846), Jul. 10, 1989.

Primary Examiner—William Briggs
Attorney, Agent, or Firm—Jacobson, Price, Holman & Stern

[57] ABSTRACT

A separable rotary tool adapter consists of a low-speed rotary unit (A) having casings (1, 2); a first rotary shaft (3) in the casing connectable to a driving shaft of the machine tool and a second rotary shaft (5) orthogonally drivingly connected to the first shaft; a high-speed rotary unit (B) having a casing (15) detachable to the casing of the low-speed rotary unit (A); a rotary shaft (20) in the casing of the high-speed unit having a free end portion (23) connectable with a rotary tool; and a planetary roller mechanism having two parts engageable with and disengageable from each other in the axial direction, each part being cooperatively associated with one of the high-speed rotary shaft and the second rotary shaft. In the low-speed rotary unit (A), a first part of the planetary roller mechanism is attached to the second rotary shaft (5) engaged with the first rotary shaft (3) at right angles via a transmission mechanism and includes planetary roller driving retainers (9) or shaft pins (10). In the high-speed rotary unit (B), a second part of the planetary roller mechanism is engageable with and disengageable from the first part. The separable rotary tool adapter in which the low-speed rotary unit (A) and high-speed rotary unit (B) are unitarily combined is mounted on a rotary tool mounting portion of a turret in a machine tool, e.g., a turret lathe.

16 Claims, 5 Drawing Sheets

SEPARABLE ROTARY TOOL ADAPTER

BACKGROUND OF THE INVENTION

1. Field of the Invention

This invention relates to a rotary tool adapter to be attached to a machine tool.

2. Description of the Prior Art

Figure 6:
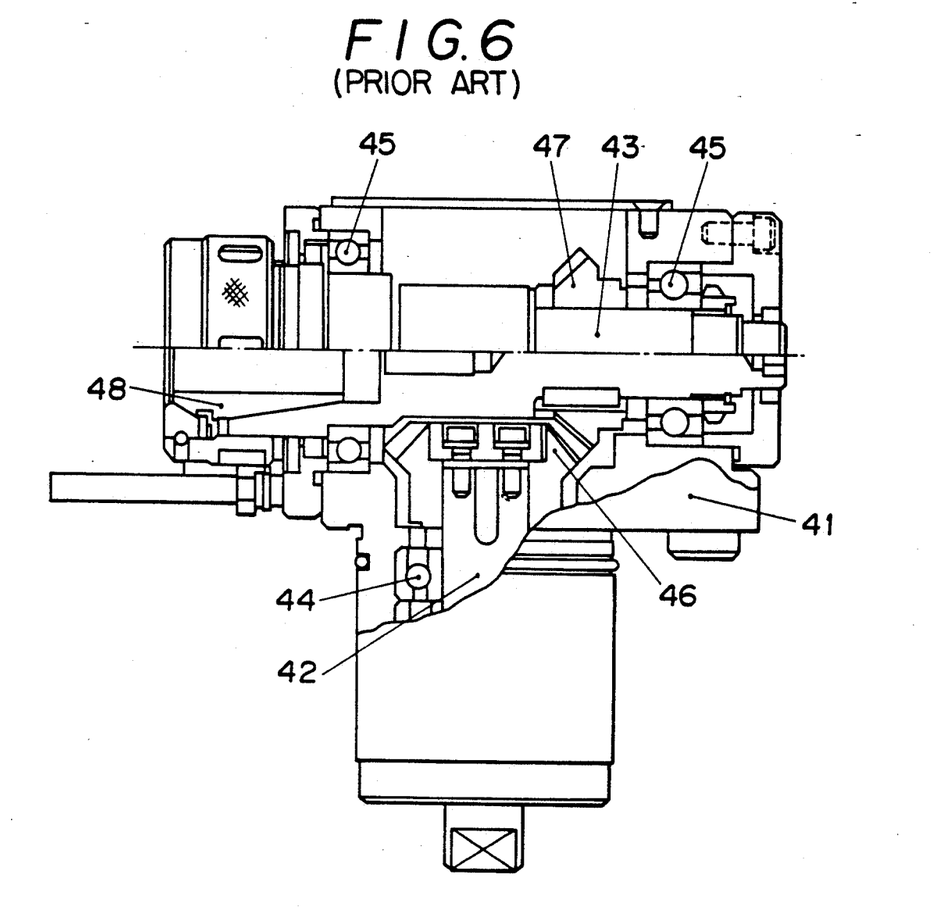
FIG. 6 is a view similar to FIG. 1 of a conventional bent rotary tool adapter.

In a conventional bent rotary tool adapter used for a turret lathe, first and second rotary shafts 42, 43 are inserted in the shape of the letter "T" through a hollow of a T-shaped cylindrical casing 41 and supported on ball-and-roller bearings 44, 45 respectively as shown in FIG. 6, in such a manner that these shafts 42, 43 can be rotated. A bevel gear 46 mounted fixedly on the free end portion of the first rotary shaft 42 and bevel gear 47 mounted fixedly on the second rotary shaft 43 are meshed with each other.

The base end portion of the first rotary shaft 42 projects outward from the casing 41 so as to be connected to a driving shaft in a head of a machine tool, and the free end portion of the second rotary shaft 43 also projects outward therefrom and is provided with a socket 48 with which a rotary tool is to be engaged.

This rotary tool adapter is set on a rotary tool mounting portion of a head of a machine tool. During this time, the first rotary shaft 42 is joined to a driving shaft in the head, and a suitable rotary tool is engaged with the socket 48 formed at the free end portion of the second rotary shaft 43. When the driving shaft in the head is rotated, the first rotary shaft 42 is rotated, and then the second rotary shaft 43 via the bevel gears 46, 47, so that the rotary tool processes a workpiece as it is rotated.

Figure 7:
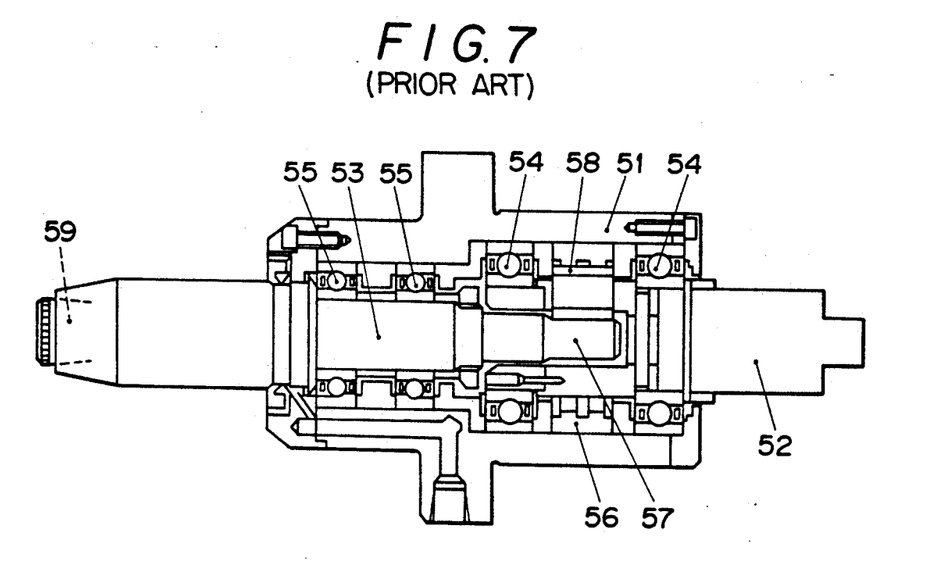
FIG. 7 is an axial cross-sectional view of a conventional straight speed-increasing rotary tool adapter.

In a conventional straight speed-increasing rotary tool adapter, an input shaft 52 and an output shaft 53 are inserted from the opposite ends of a cylindrical casing 51 thereinto and supported rotatably on ball-and-roller bearings 54, 55 respectively as shown in FIG. 7. The inner end portion of the input shaft 52 is formed cylindrically, and a suitable number of planetary roller insert holes are formed in the cylindrical wall of the inner end portion, in such a manner that these holes are spaced at regular intervals in the circumferential direction thereof. A fixed race 56 is attached to the portion of the inner circumferential surface of the casing which is opposed to the planetary roller insert holes, and the inner end portion of the output shaft 53 is inserted into the interior of the cylindrical portion of the input shaft 52 to form a sun roller 57. The planetary rollers 58 inserted rotatably in the holes in the input shaft 52 contact the fixed race 56 internally, and the sun roller 57 externally.

The outer end portion, which projects outward from the casing 51, of the input shaft 52 is formed so as to be joined to the driving shaft in the head of a machine tool, while the front end portion, which projects outward from the casing 51, of the output shaft 53 is provided with a socket 59 with which a rotary tool is to be engaged.

This rotary tool adapter is set on a rotary tool mounting portion of a head of a machine tool. During this time, the input shaft 52 is joined to a driving shaft in the head, and a suitable rotary tool is engaged with the socket 59 formed in the output shaft 53. When the driving shaft in the head is rotated, the output shaft 53 is rotated at an increased speed via the input shaft 51 and a planetary roller mechanism (fixed race 56, planetary rollers 58 and sun roller 57), so that the rotary tool processes a workpiece as it is rotated at a high speed.

This conventional bent rotary tool adapter is incapable of cutting a workpiece at a high speed when the workpiece consists of aluminum or brass, and it requires a rotary tool having a speed increasing mechanism. A straight speed-increasing rotary tool adapter is incapable of processing a surface parallel to the driving shaft in the head of a machine tool.

According to the conventional techniques, it is necessary to prepare a lot of rotary tool adapters of various specifications in accordance with the directions in which surfaces to be processed extend, dimensions of the spaces in tool heads, dimensions of rotary tools and rotational speeds of rotary, tools. Providing comparatively expensive speed increasing mechanisms for each model of rotary tool causes an extraordinary high cost increase.

SUMMARY OF THE INVENTION

The present invention provides a rotary tool adapter which solves the problems of these prior art rotary tool adapters.

A separable rotary tool adapter according to the present invention consists of a low-speed rotary unit which is provided with a casing fastened detachably to the head of a machine tool, and a rotary shaft supported rotatably on the casing and capable of being joined at the base end portion thereof to a driving shaft in the head of the machine tool, and which constitutes an adapter body mounted detachably on the head of the machine tool; and a high-speed rotary unit provided with a casing fastened detachably to the casing of the low-speed rotary unit, and a rotary shaft supported rotatably on the casing and capable of engaging at the free end portion thereof with a rotary tool directly or indirectly, a part of a planetary roller mechanism which consists of two parts engageable with and disengageable from each other in the axial direction being attached to the driving shaft in the low-speed rotary unit directly or indirectly, the other part thereof being attached to the driving shaft in the high-speed rotary unit.

In the bent low-speed rotary unit, a part of the planetary roller mechanism is attached to a rotary shaft engaged with a rotary shaft, which can be joined to the driving shaft, at right angles thereto via a transmission mechanism. The planetary roller mechanism consists of two parts, i.e. a part constituting an assembly of a fixed race, planetary rollers and a sun roller, and a part constituting planetary roller driving retainers or shaft pins which are engageable with and disengageable from the planetary rollers.

During the combining of the high-speed rotary unit with the low-speed rotary unit, the planetary rollers are engaged with planetary roller driving members. When planetary roller driving shaft pins are employed, the shaft pins are inserted in pin insert holes in the planetary rollers. When planetary roller driving retainers are employed, the retainers are inserted in the clearances among the planetary rollers. The two casings are thus combined.

The separable rotary tool adapter in which the low-speed rotary unit and a high-speed rotary unit are unitarily combined is set on a rotary tool mounting portion of a turret in a machine tool, for example, a turret lathe. During this mounting operation, the first rotary shaft is joined to a driving shaft in the turret, and the casing of the low-speed rotary unit is fixed to the turret, a suitable rotary tool being attached to the free end portion of the second rotary shaft.

The rotation of the second rotary shaft via the first rotary shaft and gears due to the rotation of the driving shaft in the turret, or the direct rotation of the first rotary shaft causes the planetary roller driving retainers or the planetary roller driving shaft pins to be rotated, whereby the planetary rollers revolve around the rotary shaft as they roll on the inner circumferential surface of the race. Owing to the planetary rollers thus revolving around the rotary shaft and rolling on their own axes, the sun roller is rotated at an increased speed. As a result, the rotary tool processes a workpiece as it is rotated at a higher speed than the rotation speed of the driving shaft in the turret.

The high- and low-speed rotary units of various specifications are used by interchanging the combinations thereof in accordance with the direction in which the surface (outer circumferential surface or end surface) of a workpiece on a turret lathe extends, dimensions of a space in the turret and dimensions and rotational speed of a rotary tool.

The above and other objects, features and advantages of the present invention will become apparent from reading of the following description which has been made in connection with the accompanying drawings.

BRIEF DESCRIPTION OF THE DRAWINGS

The present invention will now be described in detail with reference to the accompanying drawings wherein.

DESCRIPTION OF THE PREFERRED EMBODIMENTS

Embodiments of the separable rotary tool adapter according to the present invention will now be described with reference to the drawings.

Figure 1:
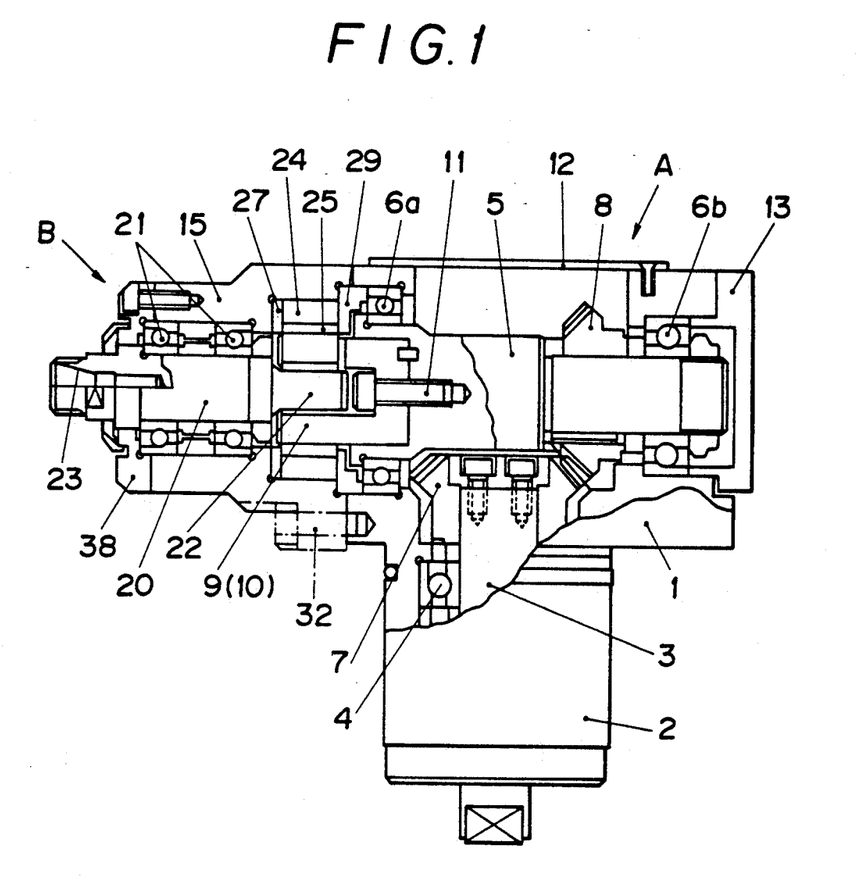
FIG. 1 is a front elevation view partly in cross section of an embodiment of the separable rotary tool adapter according to the present invention.
Figure 2:
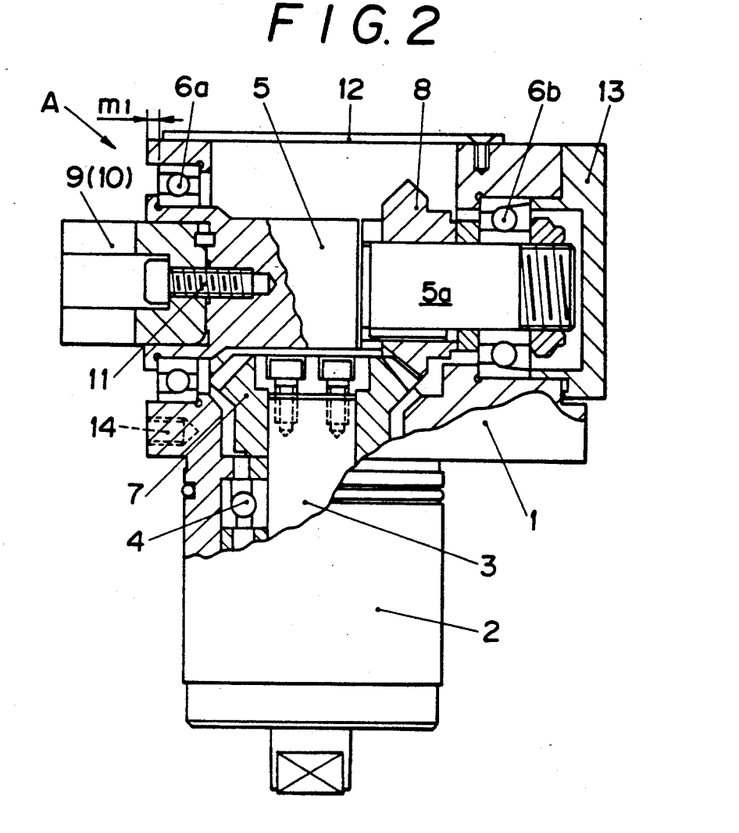
FIG. 2 is a view similar to FIG. 1 of a bent low-speed rotary unit A in the separable rotary tool adapter of FIG. 1.
Figure 3:
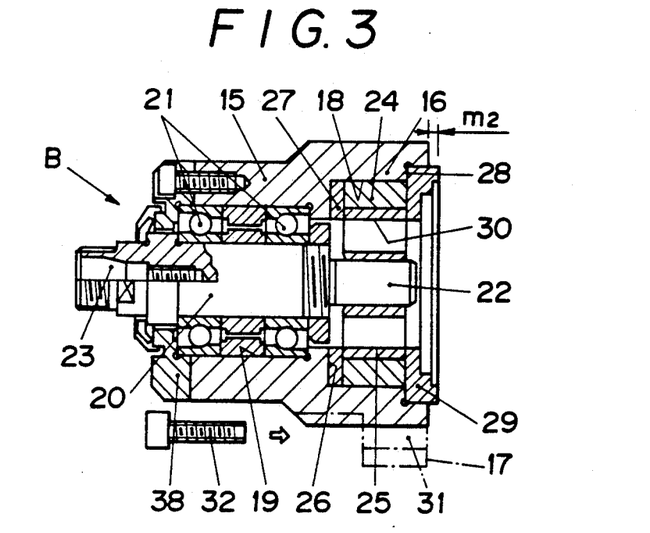
FIG. 3 is an axial cross-sectional view of a first embodiment of a high-speed rotary unit B in the separable rotary tool adapter of FIG. 1.

As shown in FIGS. 1, 2 and 3, the separable rotary tool adapter consists of a bent low-speed rotary unit A (or a straight low-speed rotary unit (not shown)) constituting an adapter body and joined detachably to a head of a machine tool, for example, a turret of a turret lathe, and a high-speed rotary unit B attached interchangeably to the low-speed rotary unit A.

First, the bent low-speed rotary unit A will be described. As shown in FIG. 2, a casing for the low-speed rotary unit A consists of a hollow rectangular cross-sectionally square casing member 1, and a cylindrical casing member 2 formed so as to project from one surface of the casing member 1, and the hollow interior portions of these casing members communicate with each other. A first rotary shaft 3 is inserted in the cylindrical casing member 2 in the axial direction thereof and is supported rotatably on ball-and-roller bearings 4, 4. A second rotary shaft 5 is inserted in the square casing member 1 and supported rotatably on a bearing 6a fitted in an opening at the front end of the hollow interior of the same casing member 1 and a bearing 6b fitted in an opening at the base end of the hollow interior of the same casing member 1 and pressed inwardly by a cover 13 (which will be referred to later). A bevel gear 7 mounted fixedly on the front end portion of the first rotary shaft 3 and a bevel gear 8 mounted fixedly on an intermediate portion 5a of the second rotary shaft 5 are meshed with each other.

The front end surface of the bearing 6a is set back from that of the square casing member 1, i.e. a high speed rotary unit mounting surface thereof by a distance $m_1$. A description of this feature will be given later.

The base end portion of the first rotary shaft 3 projects outward from the cylindrical casing member 2 so as to be joined to a driving shaft in a head of a machine tool. At the front end portion of the second rotary shaft 5, planetary roller driving members projecting outward from the square casing member 1, for example, planetary roller driving retainers 9 or planetary roller driving shaft pins 10, are fixed thereto detachably with a bolt 11. The retainers 9 or planetary roller driving shaft pins 10 are formed in a projecting manner in parallel with the axis of the second rotary shaft and arranged in the circumferential direction thereof at regular intervals so as to be opposed to planetary rollers, which will be described later, in the high-speed rotary unit B.

Covers 12, 13 are attached to assembling openings formed at the portion of the square casing member 1 which is opposed to the inner end surface of the first rotary shaft 3, and at the portion of the casing member 1 which corresponds to the base end of the second rotary shaft 5, respectively, and threaded bores 14, 14 . . . for use in fastening the high-speed rotary unit to this casing member are made in four corner portions of a high-speed rotary unit mounting surface thereof from which the planetary roller driving members project.

A straight low-speed rotary unit (not shown) will now be described. This low-speed rotary unit has only a cylindrical casing member 2 of a bent low-speed rotary unit A, and a second rotary shaft 5 and bevel gears 7, 8 are omitted. A first rotary shaft 3 is extended, and planetary roller driving members projecting outward from the cylindrical casing member 2 in the same manner as in a bent low-speed rotary unit are fixed detachably to the front end portion of the first rotary shaft with a bolt 11.

Figure 4:
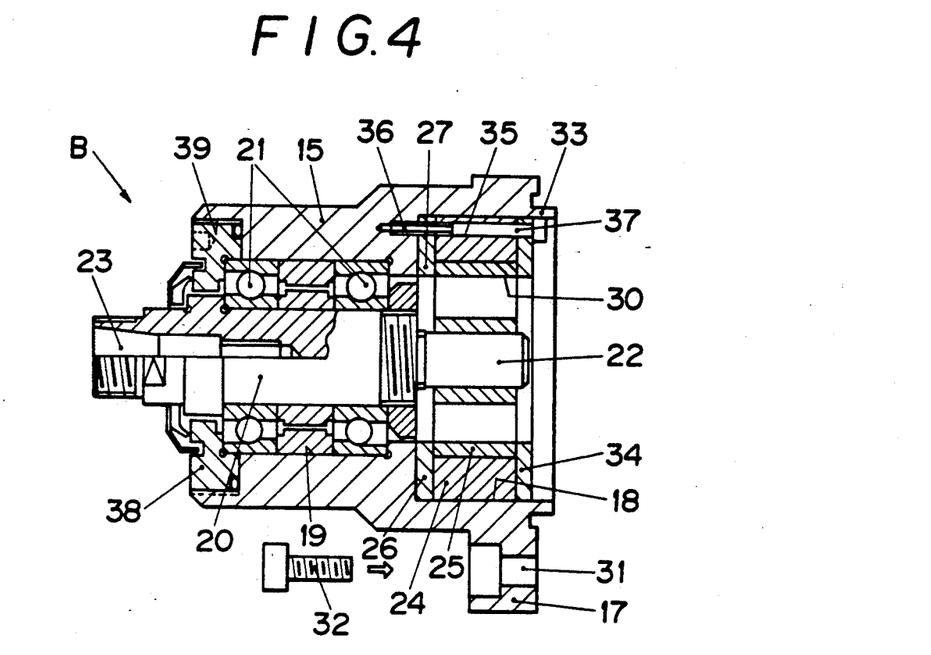
FIG. 4 is a cross-sectional view taken along the line IV—IV in FIG. 5 of a second embodiment of the high-speed rotary unit B in the separable rotary tool adapter.

The high-speed rotary unit B will now be described. As shown in FIGS. 3 and 4, a casing 15 for the high-speed rotary unit B has a stepped hollow cylindrical body, and a flange 17 (for example, a square flange shown in FIG. 5) is formed at the end of a larger-diameter portion 16 on the side of the base end thereof. A hollow interior of the casing 15 consists of a larger-diameter bore 18 on the side of the base end thereof, and a smaller-diameter bore 19 on the side of the front end thereof, and a rotary shaft 20 is inserted in the casing 15 in the axial direction thereof and supported rotatably on ball-and-roller bearings 21, 21 in the smaller-diameter bore 19. The base end portion of the rotary shaft 20 which is in the larger-diameter bore 18 in the hollow interior of the casing 15 constitutes a sun roller 22 in a planetary roller speed-increasing mechanism, and a socket 23 with which a rotary tool is engaged is formed in the front end portion, which projects from the opening of a cover 38 at the front end of the casing 15, of the rotary shaft 20.

A suitable number of planetary rollers 25, 25 . . . , for example, three or four planetary rollers are fitted between the inner circumferential surface, i.e. a raceway surface of a race 24, which is fitted firmly in concentric relation with the sun roller 22 in the larger-diameter bore 18 in the hollow of the casing, and the outer circumferential surface of the sun roller 22. The planetary rollers 25 are positioned and restrained in the axial direction thereof between an annular spacer 27 fitted firmly in a stepped bottom portion 26 of the larger-diameter bore 18 in the hollow interior and a roller holding ring 29 fitted firmly in a stepped portion 28 of the opening of the larger-diameter bore 18 or a holding ring 34 fitted in the larger-diameter bore 18. In the case where the planetary roller driving members in the low-speed rotary unit A consist at least of planetary roller driving pins 10, the planetary rollers 25 are provided therein with axially extending pin insert bores 30. (In the case where the planetary roller driving members consist of planetary roller driving retainers 9, the pin insert bores 30 may or may not be provided.)

Figure 5:
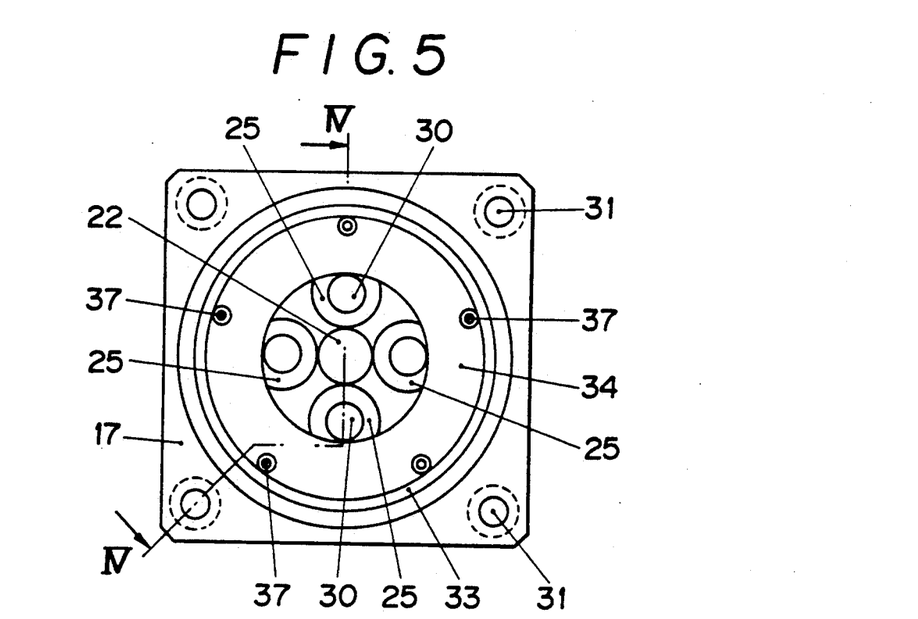
FIG. 5 is a right end view of the second embodiment of the high-speed rotary unit B in the separable rotary tool adapter.

In order to join the high-speed rotary unit B to the relative mounting surface of the bent low-speed rotary unit A, the bolts 32 inserted into the bolt holes 31, 31 as shown in FIGS. 3, 4 and 5, which are made in the flange 17 in the high-speed rotary unit B so as to extend in the axial direction thereof and so as to be spaced at 90° intervals in the circumferential direction thereof, are screwed into the threaded bores 14 in the high-speed rotary unit mounting surface, so that the planetary rollers 25 engage the planetary roller driving members. When the planetary roller driving shaft pins 10 are employed, they are inserted in the pin insert bores 30 in the planetary rollers 25, and when the planetary roller driving retainers 9 are employed, they are inserted in the clearances among the planetary rollers 25.

As a result, the end surface of the flange 17 in the high-speed rotary unit B is opposed to the front end surface of the square casing member 1 in the bent low-speed rotary unit A, i.e. the high-speed rotary unit mounting surface.

During the assembling of this structure, the following means are adopted for firmly fitting the race 24 in the larger-diameter bore 18 in the hollow.

In the first example, the outer end surface of the race 24 projects slightly from the stepped portion 28 of the opening of the larger-diameter bore 18 and contacts the roller holding ring 29 as shown in FIG. 3. The outer end surface of the roller holding ring 29 the inner end surface of which contacts the outer end surface of the race 24 projects by a distance $m_2$ from the end surface of the flange 17 of the casing 15, and this distance $m_2$ is larger than the set-back distance $m_1$ already mentioned of the front end surface of the bearing 6a in the bent low-speed rotary unit A by a holding margin $\delta$.

It is necessary that the holding margin $\delta$ be set to not lower than a predetermined level so as to fix the race 24 reliably. If, however, the holding margin $\delta$ is too large, distortion occurs in the race 24, and, therefore, it is set to 5–40$\mu$.

During the combining of the bent low-speed rotary unit A with the high-speed rotary unit B, the bolts 32 are tightened to cause the roller holding ring 29 to be fitted in the opening at the front end of the hollow interior of the square casing member 1 and engage the outer end surface of the outer race of the bearing 6a in the bent low-speed rotary unit A. Consequently, the race 24 is pressed by the outer race of the bearing 6a via the roller holding ring 29 by a distance corresponding to the holding margin $\delta$, whereby the race 24 is fixed.

In the second example, the stepped portion 28 of the opening is not formed in the larger-diameter bore 18; an annular projection 33 coaxial with the opening of the larger-diameter bore 18 is formed on the end surface of the flange 17 as shown in FIG. 4.

The race 24 is fitted in the larger-diameter bore 18 in the condition that the former is held between the annular spacer 27 and holding ring 34. Bolt holes 35 extending axially through the annular spacer 27, race 24 and holding ring 34 are provided at circumferentially spaced regular intervals, and threaded bores 36 are provided corresponding to these bolt holes in the stepped bottom portion 26 of the larger-diameter bore 18. The annular spacer 27, race 24 and holding ring 34 are tightened unitarily with the bolts 37 screwed to the threaded bores 36, so that the race 24 is fixed. Since the depth of the larger-diameter bore 18 is larger than a total thickness of the annular spacer 27, race 24 and holding ring 34, the head portions of the bolts 37 do not project from the end surface of the annular projection of the casing 15.

Due to the existence of these bolt holes 35, the surface of the race 24 is deformed at the portions thereof which correspond to the bolt holes while the planetary rollers 25 roll on this surface but, if the number of the bolt holes 35 and threaded bores 36 is set larger or smaller than that of the planetary rollers 25 by an odd number (1, 3 . . . ), an adverse effect occurring when the planetary rollers 25 pass the deformed portions of the surface of the race decreases.

During the combining of the bent low-speed rotary unit A with the high-speed rotary unit B, the bolts 32 are tightened to cause the annular projection 33 to be fitted in the opening at the front end of the hollow interior of the square casing member 1, the front end surface thereof to engage the outer end surface of the outer race of the bearing 6a in the bent low-speed rotary unit A, and the end surface of the flange 17 to be opposed to the high-speed rotary unit mounting surface.

There are in practice various types of low-speed rotary units, and the set-back distance $m_1$ of the front end surface of the bearing 6a of each low-speed rotary unit A is not uniform. Therefore, in the first example, the distance $m_2$ by which the roller holding ring 29 projects is regulated on a job site so as to obtain a predetermined holding margin but, in the second example, this regulating operation is not required.

A cover member 38 at the front end of the casing 15 in the high-speed rotary unit B serves as a holding member for the ball-and-roller bearings 21, 21. In the first example shown in FIG. 3, the cover member 38 is fastened to the front end surface of the casing 15 with bolts, while, in the second example shown in FIG. 4, the cover member 38 is engaged with a threaded portion 39 at the opened side of the smaller-diameter bore 19 in the casing 15. In the latter case, the screwing direction of the cover member 38 is set in agreement with the rotational direction of the rotary shaft 20 for preventing the cover member from being loosened while the adapter is in use, and the cover member is ready to be turned in the tightening direction due to a seal contacting the same.

The combining of the straight low-speed rotary unit with the high-speed rotary unit B is also done in the same manner as mentioned manner.

The separable rotary tool adapter in which the low-speed rotary unit and high-speed rotary unit are combined unitarily is set on a rotary tool mounting portion of a machine tool, for example, such a portion of a turret in a turret lathe. During this time, the first rotary shaft 3 is joined to the driving shaft in the turret, and the base end portion of the cylindrical casing member 2 of the low-speed rotary unit A is fixed to the turret, a suitable rotary tool being engaged with the socket 23 at the front end portion of the second rotary shaft 5.

When the driving shaft in the turret is rotated with a bent low-speed rotary unit A joined to the high-speed rotary unit, the second rotary shaft 5 is rotated via the first rotary shaft 3 and bevel gears 7, 8. Namely, the planetary roller driving retainers 9 or planetary roller driving shaft pins 10 revolve around the axis of the second rotary shaft 5, so that the planetary rollers 25 revolve around the same axis as they roll on the inner circumferential surface of the race 24. Owing to the planetary rollers 25 revolving around the axis of the rotary shaft 5 and rotating on their own axes, the sun roller 22 is rotated at an increased speed which is higher than the rotational speed of the second rotary shaft 5. As a result, the rotary tool is rotated at a speed higher than that of the driving shaft in the turret, and carries out the processing of a workpiece.

When the driving shaft in the turret is rotated with a straight low-speed rotary unit joined to the high-speed rotary unit, the first rotary shaft 3 is rotated. Namely, the planetary roller driving retainers 9 or planetary roller driving shaft pins 10 revolve around the axis of the first rotary shaft 3, so that the planetary rollers 25 revolve around the same axis as they roll on the inner circumferential surface of the race 24. Consequently, the rotary tool is rotated at a speed higher than the rotational speed of the driving shaft in the turret and processes a workpiece in the same manner as the rotary tool on the adapter employing the bent low-speed rotary unit A.

A turret lathe can be used correspondingly to the direction in which the surface (outer circumferential surface and an end surface) to be processed of a workpiece faces, by using the bent low-speed rotary unit A and straight low-speed rotary unit interchangeably with the high-speed rotary unit B used in common.

The size of each portion of the high-speed rotary unit B is varied in accordance with the dimensions of the space in the turret and the sizes and rotational speeds of the rotary tools. If such variously-sized high-speed rotary units B are available, they can be used suitably for various dimensions of the space in the turret in a turret lathe and various sizes and rotational speeds of rotary tools by changing one rotary unit B to another and fixing the resultant rotary unit B to a single low speed rotary unit A with the bolts 32 removed from and driven into the rotary units B, A. Moreover, if various sizes of planetary roller driving members, i.e. planetary roller driving shaft pins 10 or planetary roller driving retainers 9 are used by changing one type of driving members to another and installing the resultant driving members with the bolts 11 removed from and driven into the rotary shaft 5, the specifications can be further diversified.

The above-described separable rotary tool adapter can be used for any direction in which the surface (an outer circumferential surface and an end surface) to be processed of a workpiece in a machine tool, for example, a turret lathe faces, by using the bent low-speed rotary unit and the straight low-speed rotary unit selectively and the high-speed rotary unit in common.

The size of each portion of the high-speed rotary unit is varied in accordance with the dimensions of the space in the turret and the sizes and rotational speeds of the rotary tools. If such variously-sized high-speed rotary units are available, they can be used suitably for various dimensions of the space in the turret in a turret lathe and various sizes and rotational speeds of rotary tools by changing one high-speed rotary unit to another and fixing the resultant high-speed rotary unit to a single low-speed rotary unit.

Therefore, the separable rotary tool adapter according to the present invention can be applied to various types of machine tools and various kinds of high-speed processing operations by a combination of a low-speed rotary unit and a high-speed rotary unit without providing a lot of special rotary tool adapters of various specifications.

While the present invention has been described above with respect to a typical preferred embodiment thereof, it should, of course, be understood that it should not be limited only to them but various changes or modifications may be made without departure from the scope of the invention as defined by the appended claims.

We claim:

1. A separable rotary tool adapter comprising:
    a low-speed rotary unit comprising a casing means detachably mountable on the head of a machine tool having a driving shaft, and a rotary shaft means rotatably mounted on said casing means and having a base end portion connectable to said driving shaft of said machine tool, so that said low-speed rotary unit constitutes an adapter body detachably mounted on said head of said machine tool;
    a high-speed rotary unit comprising a casing detachably connectable to said casing means of said low-speed rotary unit, a high-speed rotary shaft rotatably mounted on said casing of said high-speed rotary unit, and a free end portion on said high-speed rotary shaft for detachably connecting to a rotary tool;
    a planetary roller mechanism substantially between said low-speed and high-speed rotary units;
    a planetary roller driving member in said planetary roller mechanism connected to said rotary shaft means of said low-speed rotary unit;
    a fixed annular outer race of said planetary roller mechanism mounted in said casing of said high-speed rotary unit, said race having an inner circumference;
    a sun roller connected to said rotary shaft of said high-speed rotary unit and disposed co-axially in spaced relationship radially inwardly with respect to said inner circumference of said outer race to provide an annular planetary roller space;
    a plurality of planetary rollers mounted in said planetary roller space for rotatable and circumferential movement therein;
    said planetary roller driving member being detachably engageable with said plurality of planetary rollers for driving said planetary rollers; and pressure means for maintaining said plurality of planetary rollers in an operable position in said planetary roller space when said low-speed and high-speed rotary units are connected together, so that rotation of said machine tool driving shaft rotates said rotary shaft means of said low-speed rotary unit at a first rotary speed and said rotary means of said high-speed rotary unit through said planetary roller mechanism at a second higher speed.

2. A separable rotary tool adapter as claimed in claim 1 wherein:

said rotary shaft means of said low-speed rotary unit comprises a first shaft removably connectable to said machine tool driving shaft, a second shaft having a central axis of rotation orthogonal to the axis of rotation of said first shaft, and a transmission mechanism mounted on said first and second shafts so that rotation of said first shaft rotates said second shaft at said first speed; and said planetary roller driving member is mounted on said second shaft.

3. The separable rotary tool adapter as claimed in claim 2 wherein:

said planetary roller driving member comprises a retainer means detachably engageable with said planetary rollers for driving said planetary rollers.

4. The separable rotary tool adapter as claimed in claim 2 wherein:

said planetary roller driving member comprises shaft pin means detachably engageable with said planetary rollers for driving said planetary rollers.

5. The separable rotary tool adapter as claimed in claim 1 and further comprising:

a retainer ring mounted on said casing of said high-speed rotary unit and between said low-speed and high-speed rotary units when said rotary units are connected together for retaining said outer race of said planetary roller mechanism in fixed position in said casing of said high-speed rotary unit.

6. The separable rotary tool adapter as claimed in claim 2 and further comprising:

a retainer ring mounted on said casing of said high-speed rotary unit and between said low-speed and high-speed rotary units when said rotary units are connected together for retaining said outer race of said planetary roller mechanism in fixed position in said casing of said high-speed rotary unit.

7. The separable rotary tool adapter as claimed in claim 3 and further comprising:

a retainer ring mounted on said casing of said high-speed rotary unit and between said low-speed and high-speed rotary units when said rotary units are connected together for retaining said outer race of said planetary roller mechanism in fixed position in said casing of said high-speed rotary unit.

8. The separable rotary tool adapter as claimed in claim 4 and further comprising:

a retainer ring mounted on said casing of said high-speed rotary unit and between said low-speed and high-speed rotary units when said rotary units are connected together for retaining said outer race of said planetary roller mechanism in fixed position in said casing of said high-speed rotary unit.

9. The separable rotary tool adapter as claimed in claim 1 wherein:

said sun roller is integral with said rotary shaft of said high-speed rotary unit.

10. The separable rotary tool adapter as claimed in claim 2 wherein:

said sun roller is integral with said rotary shaft of said high-speed rotary unit.

11. The separable rotary tool adapter as claimed in claim 3 wherein:

said sun roller is integral with said rotary shaft of said high-speed rotary unit.

12. The separable rotary tool adapter as claimed in claim 4 wherein:

said sun roller is integral with said rotary shaft of said high-speed rotary unit.

13. The separable rotary tool adapter as claimed in claim 5 wherein:

said sun roller is integral with said rotary shaft of said high-speed rotary unit.

14. The separable rotary tool adapter as claimed in claim 6 wherein:

said sun roller is integral with said rotary shaft of said high-speed rotary unit.

15. The separable rotary tool adapter as claimed in claim 7 wherein:

said sun roller is integral with said rotary shaft of said high-speed rotary unit.

16. The separable rotary tool adapter as claimed in claim 8 wherein:

said sun roller is integral with said rotary shaft of said high-speed rotary unit.

* * * * *